Patented Dec. 26, 1944

2,365,703

UNITED STATES PATENT OFFICE 2,365,703

ALKYLATED CYCLOBUTANE CARBOXYLIC ACID PRODUCTS AND PROCESS FOR PRODUCING THEM

Edward J. Jahn, Edwardsville, Ill., assignor to Shell Development Company, San Francisco, Calif., a corporation of Delaware No Drawing. Application March 2, 1942, Serial No. 433,026

18 Claims. (Cl. 260—341)

This invention relates to a process for the production of valuable products from mono-olefinic hydrocarbons. More particularly, the invention pertains to a single-step method of manufacturing substantially saturated products by reacting mono-olefins with maleic acid anhydride, and to the novel products obtainable thereby.

It is known that mono-olefinic hydrocarbons react, by what is termed the 1,2-addition reaction, with compounds containing an ethylenic group linked directly and in conjugated relation to a carbonyl group such as maleic acid anhydride to give unsaturated compounds. The reaction is shown by Eichwald in U. S. Patent 2,055,456 as well as by Moser in U. S. Patents 2,124,628, 2,133,734 and 2,230,005. The reaction is also disclosed in an application of Van Melsen, Serial No. 263,056, filed March 20, 1939. In each case, the condensation or addition products obtained by the 1,2-addition reaction are unsaturated compounds. This disclosed reaction may be illustrated, for example, by that which occurs in the reaction of octadecylene with maleic anhydride. The reaction may be represented as follows:

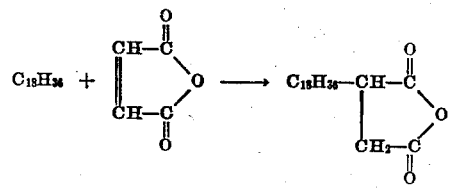

It is seen that the product is unsaturated, being an alkenyl succinic acid anhydride. While such unsaturated compounds, and especially the corresponding acids obtained by hydration of the anhydrides, are valuable products for certain uses, their unsaturated character is a serious disadvantage in some applications. For instance, the alkenyl succinic acids from higher olefins have the property of inhibiting rust formation. When small quantities are employed in admixture with hydrocarbon oils such as in turbine oils, for example, which are subjected to contact with ferruginous metals in the presence of water and air, the presence of the substituted succinic acid is effective in preventing rust formation. However, the unsaturation of the compounds makes them very susceptible to oxidation under the conditions of elevated temperature at which turbine oils are required to operate. By hydrogenating the compounds so as to obtain saturated products, it has been found that the products obtained are much more resistant to oxidation or destruction which causes the rust inhibiting qualities of the substances to be terminated. The saturated compounds will, therefore, prevent rusting of metals for a much longer period of time than the corresponding unsaturated compounds. The superior properties of the saturated acids are shown in copending application of Von Fuchs and Wilson, Serial No. 379,462, filed February 18, 1941. Although the saturated compounds—i. e. the alkyl succinic acids, are superior and more desirable than the alkenyl succinic acids, the conversion of the unsaturated compounds to the saturated products is a difficult and expensive operation requiring special high pressure equipment. The preparation of the saturated products by methods known prior to my invention required two operational steps; one, to effect the 1,2-addition reaction and obtain the unsaturated condensation product; and a second, involving hydrogenation of the unsaturated product.

It is an object of the present invention to provide a simple and efficient process for manufacturing saturated, substituted succinic acids. Another object is to provide a method whereby a mono-olefinic hydrocarbon may be reacted with a compound containing the characteristic grouping

to produce a saturated product by means of a single step operation. A further object of the invention is to provide a novel and useful class of products. These and other objects will be apparent from the description of the invention given hereinafter.

The invention is based upon my discovery that a mono-olefinic hydrocarbon may be reacted with maleic acid anhydride to give a saturated product provided the reaction is effected in the presence of iodine. Thus, according to the process of the invention, a saturated compound is obtained by reacting, in the presence of elemental iodine, a mono-olefinic hydrocarbon with a compound containing an ethylenic or olefinic group linked directly to a carbonyl group. The elemental iodine employed in the process functions as a catalyst in directing the reactants to combine by an entirely new reaction to form novel products. It appears that the action of the iodine is two-fold; first, it acts as an accelerator for the condensation reaction, and second, as an operator which causes the new reaction to occur so as to obtain a saturated product.

As was pointed out above, the 1,2-addition reaction of an olefine with maleic acid anhydride gives an alkenyl succinic acid anhydride which product must be hydrogenated in order to obtain the desired saturated product. When an olefine is reacted with maleic acid anhydride in the presence of iodine according to the process of the invention, the product obtained is saturated, making hydrogenation thereof unnecessary. The mechanism of the reaction occurring in the presence of iodine is, therefore, different than that which occurs in the absence of iodine. In the latter case, the maleic acid anhydride attaches itself at the double bond of the olefin by only one carbon-to-carbon bond leaving the double bond of the olefin untouched. The mechanism of the reaction in the presence of iodine is not fully understood, but it is believed that the two carbon atoms of the ethylenic group in the maleic acid anhydride become linked to the two carbon atoms of the ethylenic group in the olefin to form a saturated compound containing a four-carbon-atom ring. While this mechanism seems reasonable and agrees with the facts of my discovery, it is to be understood that the invention is not to be construed as limited thereto, but is only a theory advanced for the purpose of describing the invention more fully.

In passing, it may be stated that saturated products are not obtained according to the process wherein iodine is employed mereby by formation of an alkenyl succinic acid anhydride by the well known 1,2-addition reaction which product is then saturated by addition of iodine. The reaction occurring in my process is entirely different from such a scheme for several reasons as is apparent from the following. First, the process of the invention may be executed to yield saturated products in the presence of far too small quantities of iodine to saturate the products by the iodine addition reaction. Second, the final products contain no appreciable quantities of combined iodine. It is, therefore, evident that the process involves an entirely new reaction.

A variety of mono-olefinic hydrocarbons are employed as reactants in the process of my invention. These may be utilized either as individual compounds, as mixtures of unsaturated compounds, or in admixture with other compounds such as saturated hydrocarbons. Among representative types of mono-olefinic hydrocarbons are such substances as ethylene, propylene, butylene, isobutylene, amylene, octylene, decylene, dodecylene, hexadecylene, octadecylene, hexatricotylene, styrene, diphenylethylene, cyclohexylene, methyl cyclohexylene, cracked distillate as obtained by cracking of hydrocarbon waxes, oils or gases mono-olefines as obtained by dehydration of monohydric alcohols, and the like.

The mono-olefinic hydrocarbon is reacted with a compound containing the characteristic grouping

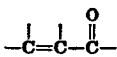

i. e., the compound contains an ethylenic group linked directly to a carbonyl group. Representative compounds embraced within the class of reactants include maleic acid anhydride, maleic acid, maleic acid esters such as diethyl maleate, diphenyl maleate, etc., crotonic acid, cinnamaldehyde, cinnamic acid, methylene malonic diethyl ester, acrolein, quinone, naphthoquinone, mesityl oxide, furfural, fumaric acid, itaconic acid, itaconic acid anhydride, acrylic acid anhydride, citraconic acid anhydride, mesaconic acid, acrylic acid, methyl vinyl ketone, methyl isopropylene ketone, cinnamylidene acetone, uric acid, caffeine, and the like.

The process of the invention is executed by contacting in a closed vessel the mono-olefinic hydrocarbon and the compound containing an ethylenic group in conjugated relation to a carbonyl group with elemental iodine, preferably at elevated temperature. Since the desired reaction is effected primarily in the liquid phase, it is desirable that the reaction mixture be heated by any suitable means in a closed vessel and that the pressure employed be sufficient to maintain at least a part of the reaction mixture in the liquid phase. The optimum temperature of operation of the process varies with the reactivity of the particular reactants employed. Reactants of greater reactivity are desirably treated in the process at lower temperatures than those of lesser reactivity. In general, the process is effected at a temperature at which the reaction proceeds at an appreciable rate, but below that at which substantial decomposition of reactants and/or products occurs. A temperature between about 150° C. and 250° C. is ordinarily suitable.

The iodine used as catalyst in the process is employed in its free or elemental form. While the amount or proportion of iodine may be varied considerably, about 0.01 to 2.0 per cent based on the weight of the mono-olefin is satisfactory. The preferred amount of iodine will vary with the individual reactants utilized; those of greater reactivity requiring the smaller amounts of catalyst. For example, it is preferred to use from about 0.1 to 0.5 per cent in reacting maleic acid anhydride with aliphatic mono-olefins having from 16 to 24 carbon atoms, but slightly more, from about 0.2 to 1.0 per cent, with higher olefins. If more iodine is used over-condensation becomes excessive, resulting in the formation of highly-acidic oil-insoluble compounds of lesser desirability.

It is usually desirable to use an excess of one reactant over the theoretical amount. Upon completion of the reaction, the unreacted material together with undesired by-products may then be removed from the desired products. For example, in reacting octadecylene with excess maleic acid anhydride, the unreacted material may be removed by steaming the reaction mixture which also removes the iodine catalyst. This treatment of the reaction mixture is further useful in that the acid anhydride is hydrated to the free acid which is an additional step employed in the process of the invention when free acids are desired as products. With higher mono-olefins, treatment by steaming may be ineffective in which case other methods are used. Impurities which are obtained when hexatricotylene is reacted with maleic acid anhydride are removed by treating the reaction mixture with acetone, the impurities being insoluble therein while the desired product dissolves. The treated mixture is filtered to separate the impurities and the acetone separated from the purified product by evaporation.

In the preferred embodiment of the invention which produces the novel corrosion-inhibiting compounds of superior oxidation stability, maleic acid anhydride is reacted with an aliphatic mono-olefinic hydrocarbon which preferably contains at least 16 carbon atoms. The reaction is effected in the presence of iodine whereby saturated products are obtained.

The unexpected catalytic effect of the presence of iodine is shown by the results of two experiments which were identical except that in one no iodine was used while in the other iodine was added to the reaction mixture. The reactants in each case were maleic acid anhydride and a mono-olefin containing 36 carbon atoms. The mono-olefin was obtained by distillation from a mixture of hexatricotylene and octadecylene, the mixture having been produced by dehydrating octadecyl alcohol over Filtrol clay at 380° F. to 390° F. under vacuum wherein the octadecylene formed was in part polymerized during the dehydration reaction to yield the hexatricotylene. The bromine number of the mono-olefin employed as reactant was 32. In each experiment a 50 per cent excess of maleic acid anhydride was used and the reactants were heated at about 235° C. About 0.2 per cent by weight of iodine, based on the olefin, which was dissolved in a small quantity of benzene was used as catalyst in conducting the experiment according to the process of the invention. The reaction period was for 5 hours after which the unreacted maleic acid anhydride was removed and the following properties obtained for the products:

|  | Percentage iodine | |
| --- | --- | --- |
|  | None | 0.2 |
| Neutralization number | 65 | 138 |
| Bromine number | 25 | 4 |

It is seen that by effecting the reaction in the presence of iodine, the product obtained has a negligible bromine number indicating that the product is saturated.

The products of the invention are the anhydrides together with the free acids of substituted succinic acid wherein each of the two intervening carbon atoms between the carboxyl groups are linked directly to separate carbon atoms of a divalent alkylene group. It is believed that the products in the case of the anhydrides may be represented by the general formula:

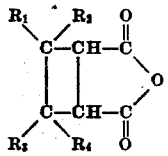

wherein $R_1$, $R_2$, $R_3$ and $R_4$ are substituents each of which is a hydrogen atom or an alkyl group. Also included within the purview of the invention are the free acids obtained by hydrating the acid anhydrides which compounds it is believed may be represented by the general formula:

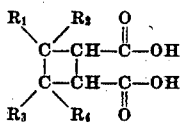

wherein $R_1$, $R_2$, $R_3$ and $R_4$ are substituents each of which is a hydrogen atom or an alkyl group. The compounds which have a divalent alkylene radical linked to the succinic acid residue wherein said residue contains from 16 to 24 carbon atoms constitute a preferred class of products owing to their favorable rust-proofing characteristics and excellent emulsion characteristics for use in turbine oils. These compounds are those wherein the sum of the carbon atoms in $R_1$, $R_2$, $R_3$ and $R_4$ as designated by the above formulae contain from 14 to 22 carbon atoms.

The products of the invention, in addition to being useful as corrosion inhibitors, are valuable substances for a variety of uses such as manufacture of alkyd resins, in pharmaceutical preparations, for preparation of plasticizers, and the like.

I claim as my invention:

1. A process for the production of a saturated, substituted succinic acid anhydride which comprises reacting octadecylene with maleic acid anhydride in the presence of elemental iodine.

2. A process for the manufacture of valuable dibasic acid compounds which comprises reacting an aliphatic mono-olefin with maleic acid anhydride, said reaction being effected in the presence of elemental iodine, and hydrating the resulting acid anhydride.

3. A process for the manufacture of valuable products which comprises reacting an aliphatic mono-olefin with maleic acid anhydride, said reaction being effected in the presence of elemental iodine.

4. A process according to claim 2 wherein the aliphatic mono-olefin contains from 16 to 24 carbon atoms.

5. A process according to claim 3 wherein the aliphatic mono-olefin contains from 16 to 24 carbon atoms.

6. A process for the manufacture of valuable compounds which comprises reacting a mono-olefinic hydrocarbon with maleic acid anhydride, said reaction being effected in the presence of elemental iodine.

7. A process for the manufacture of valuable compounds which comprises reacting a mono-olefinic hydrocarbon with a mono-olefinic compound having the olefinic linkage between two carbon atoms, one of which is linked directly to a carbonyl group, said reaction being effected in the presence of elemental iodine, whereby a saturated reaction product is obtained which contains a four carbon atom ring by linkage of the two carbon atoms of the olefinic group of said hydrocarbon with the two carbon atoms of the olefinic group of the carbonylic compound.

8. 3-alkylcyclobutane-1,2-dicarboxylic acid wherein the sum of the carbon atoms in said alkyl group is 16.

9. 3-alkylcyclobutane-1,2-dicarboxylic acid anhydride wherein the sum of the carbon atoms in said alkyl group is 16.

10. 3-alkylcyclobutane-1,2-dicarboxylic acid wherein the sum of the carbon atoms in said alkyl group is from 14 to 22.

11. 3-alkylcyclobutane-1,2-dicarboxylic acid anhydride wherein the sum of the carbon atoms in said alkyl group is from 14 to 22.

12. 3-alkylcyclobutane-1,2-dicarboxylic acid wherein the sum of the carbon atoms in said alkyl group is at least 14.

13. 3-alkylcyclobutane-1,2-dicarboxylic acid anhydride wherein the sum of the carbon atoms in said alkyl group is at least 14.

14. A substituted succinic acid anhydride wherein each of the two intervening carbon atoms between the carbonyl groups is linked directly by a single bond to the respective vicinal carbon atoms from which stems the free valence of a divalent alkylene group, said alkylene group containing at least 16 carbon atoms.

15. A compound from the class consisting of 3-alkylcyclobutane-1,2-dicarboxylic acid and 3-alkylcyclobutane-1,2-dicarboxylic acid anhydride wherein the sum of the carbon atoms in the alkyl group of said compounds is at least 14.

16. A process for the production of valuable products, which comprises reacting an aliphatic mono-olefine containing at least 16 carbon atoms with maleic acid anhydride in a liquid phase at a temperature of from 150 to 250° C. and in the presence of from 0.01 to 2.0% elemental iodine based on the weight of said mono-olefine.

17. A process for the production of valuable products which comprises reacting an aliphatic mono-olefine containing 16 to 24 carbon atoms with maleic acid anhydride in the liquid phase at a temperature of from 150 to 250° C. and in the presence of from 0.01 to 0.5% elemental iodine based on the weight of said mono-olefine.

18. A process for the production of valuable products which comprises reacting an aliphatic mono-olefine containing more than 24 carbon atoms with maleic acid anhydride in the liquid phase at a temperature of from 150 to 250° C. and in the presence of from 0.2 to 1.0% elemental iodine based on the weight of said mono-olefine.

EDWARD J. JAHN.